United States Patent Office 3,711,494
Patented Jan. 16, 1973

3,711,494
O,O-DIALKYLTHIONOPHOSPHORIC OR O,O-DIALKYLDITHIOPHOSPHORIC ESTERS OF OXADIAZOLES
Heinrich Adolphi, Limburgerhof, Heinz Eilingsfeld, Frankenthal, and Manfred Patsch, Ludwigshafen, Germany, assignors to Badische Anilin- & Soda-Fabrik Aktiengesellschaft, Ludwigshafen am Rhine, Rheinland-Pfalz, Germany
No Drawing. Filed Aug. 19, 1970, Ser. No. 65,266
Claims priority, application Germany, Aug. 23, 1969, P 19 42 993.7
Int. Cl. C07d 85/54
U.S. Cl. 260—307 G
6 Claims

ABSTRACT OF THE DISCLOSURE

O,O-dialkylthionophosphoric or O,O-dialkyldithiophosphoric esters of alkyl-1,3,4 oxadiazoles and di-(O,O-dialkylthionophosphoric or O,O-dialkyldithionophosphoric esters) of 1,3-4-oxadiazoles having a strong insecticidal and acaricidal action, and a process for controlling insects and mites with these compounds.

---

The present invention relates to new and valuable O,O-dialkylthionophosphoric or O,O-dialkyldithiophosphoric esters of oxadiazoles and to insecticides containing these compounds as active ingredients.

It is known to use substituted phosphoric esters having the formulae

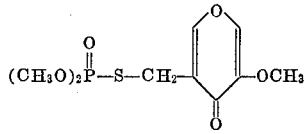

and

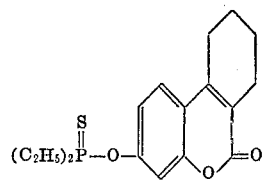

as insecticidal active ingredients; however, their action is unsatisfactory.

We have now found that O,O-dialkylthionophosphoric or O,O-dialkyldithiophosphoric esters of oxadiazoles having the formula

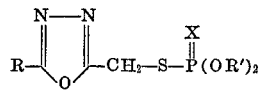

where R' denotes a lower alkyl radical (methyl, ethyl, propyl, isopropyl, butyl, isobutyl), X denotes oxygen or sulfur and R denotes an alkyl radical having 1 to 5 carbon atoms or an aryl radical (p-nitrophenyl, 2,4-dinitrophenyl) which may be substituted by halogen (chloro, dichloro, trichloro) or by nitro groups, or R denotes the radical

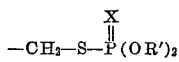

X and R' having the meanings given above, have a good insecticidal action. The action is particularly effective on mites and insects.

The new active ingredients may be prepared by reacting substituted oxadiazoles-1,3,4 having the formula

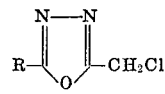

where R denotes an alkyl radical having 1 to 5 carbon atoms or R denotes an aryl radical which may be substituted by halogen or nitro groups or R denotes the radical —CH$_2$Cl, with the alkali metal salts of O,O-dialkylthionophosphoric or O,O-dialkyldithiophosphoric esters having the formula $$(R'O)_2\overset{S}{\overset{\|}{P}}-X-A$$

where R' and X have the above meanings and A denotes the radical of an alkali metal (Na, K).

The reaction is preferably carried out in an organic solvent, e.g., acetone, tetrahydrofuran, methylene chloride, benzene, ethyl acetate, at temperatures of from 20° to 80° C. It is possible to use both reactants in equimolar amounts or either of them in excess. Upon completion of the reaction, the common salt formed is filtered off from the mixture which is then concentrated. The new compounds are oily liquids which decompose easily at temperatures above 160° C. Their structure may be confirmed by nuclear resonance spectra.

The preparation of the new active ingredients is illustrated by the following examples.

EXAMPLE 1

13.3 parts (by weight) of chloromethyl-methyloxadiazole-1,3,4 (accessible by reaction of acetic hydrazide with chloroacetyl chloride in aqueous NaOH at 0° C. and subsequent cyclization with phosphorus pentoxide at 200° C.) and 15 parts of the sodium salt of O,O-dimethyldithiophosphoric ester are stirred in acetone for 3 hours at 60° C. The reaction mixture is filtered and concentrated, thus isolating 21.5 parts of the compound

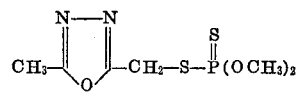

NMR (CDCl$_3$): 2.59 (S), 3.72 (D), 4.20 (D), 3:6:2.

EXAMPLE 2

10 parts of chloromethyl-methyloxadiazole-1,3,4 and 17.8 parts of the sodium salt of O,O-diethyldithophosphoric ester are heated in 150 parts of acetone for 2 hours at 60° C. The common salt formed is filtered off and the mother liquor concentrated. The yield is 23.2 parts of the compound

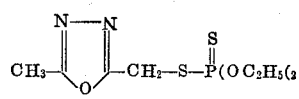

NMR (CDCl$_3$): 1.35 (T), 2.55 (S), ~4.2 (M), 6:3:6.

EXAMPLE 3

Adopting the procedure of Example 1, 13.3 parts of chloromethyl-methyloxadiazole-1,3,4 is reacted with 23.6 parts of the sodium salt of O,O-di-n-propyldithiophosphoric ester. There is isolated 32.0 parts of the compound

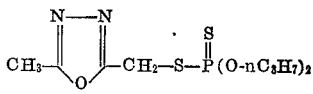

NMS (d-DMSO): 0.9 (T), 2.6 (M), 2.5 (S), 4.0 (M), 6:4:3:6.

EXAMPLE 4

16.7 parts of bis-chloromethyloxadiazole-1,3,4 (accessible by reacting hydrazine hydrate with chloroacetyl chloride in aqueous NaOH and subsequent cyclization with phosphorus pentoxide at 0° C.) is heated for 3 hours at 60° C. with 30 parts of the sodium salt of O,O-dimethyldithiophosphoric ester in 150 parts of tetrahydrofuran. The reaction mixture is filtered and the solvent distilled off in vacuo. The yield is 35 parts of the compound

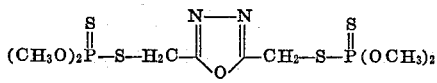

NMR (CDCl$_3$): 3.7 (D), 4.2 (D), 6:2.

EXAMPLE 5

15 parts of bis-chloromethyloxadiazole-1,3,4 and 37.4 parts of the sodium salt of O,O-diethyldithiophosphoric ester are stirred in 150 parts of acetone for 4 hours at 60° C. The precipitate formed is filtered off and the filtrate concentrated in vacuo. The yield is 44.8 parts of the compound

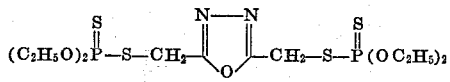

NMR (CDCl$_3$): 1.4 (T), 4.1 (M), 1:1.

EXAMPLE 6

16.7 parts of bis-chloromethyloxadiazole-1,3-4 is dissolved in 200 parts of benzene; 40.6 parts of the ammonium salt of O,O-diethylthionophosphoric ester is then added to this mixture. After heating the whole for 5 hours at 60° C. the precipitate is filtered off and the filtrate is concentrated in vacuo. The yield is 37.8 of the compound

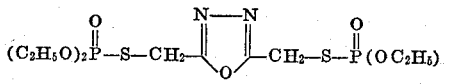

NMR (d-acetone): 1.35 (T), 4.22 (M), 1:1.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronapthalene or alkylated naphthalenes, or organic liquids having boiling points higher than 150° C. and having one or more than one functional group, e.g. the keto group, the ether group, the ether group, the ester group or the amide group, this group or these groups being attached as substituent(s) to a hydrocarbon chain or being a component of a heterocyclic ring, may be used as spray liquids.

Aqueous formulations may be prepared from emulsions concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following known active ingredients are used in the biological comparative experiments:

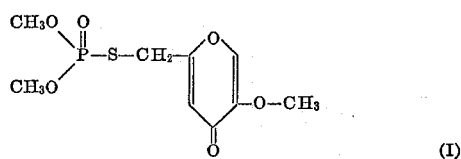

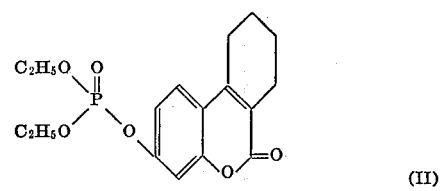

EXAMPLE 7

Action on two-spotted spider mite (*Tetranychus telarius*)

Potted bean plants which have been heavily attacked by two-spotted spider mites are sprayed to run-off with aqueous emulsions of the active ingredients listed below. The action is determined after 6 days. After this period an active ingredient should have eradicated any living larvae or adults of the two-spotted spider mite.

| Active ingredient: | Concentration of the active ingredient in the emulsion in percent by weight |
|---|---|
| From Example 1 | effective__ 0.05 |
| From Example 2 | do____ 0.05 |
| From Example 4 | do____ 0.05 |
| From Example 6 | do____ 0.01 |
| II (for comparison purposes) | ineffective__ 0.1 |
| I (for comparison purposes) | effective__ 0.1 |

EXAMPLE 8

Contact action on oriental cockroach (*Blatta orientalis*)

The inner surfaces of 1 liter glass vessels are wetted with an acetonic solution of the active ingredients listed below. After the solvent has evaporated, adult cockroaches (*Blatta orientalis*) are introduced into the vessels and the mortality is determined after 48 hours.

| Active ingredient: | Amount of the active ingredient on the inner surface of the glass vessel |
|---|---|
| From Example 1 | mg. effective__ 0.5 |
| From Example 2 | do____ 0.1 |
| From Example 4 | do____ 2.5 |
| From Example 5 | do____ 1.0 |
| I (for comparison purposes) | do____ 5.0 |
| II (for comparison purposes) | mg. ineffective__ 10.0 |

EXAMPLE 9

70 parts by weight of the compound from Example 1 is mixed with 30 parts by weight of N-methyl-α-pyrrolidone. A mixture is obtained which is suitable for application in the form of very fine drops.

EXAMPLE 10

20 parts by weight of the compound from Example 2 is dissolved in a mixture consisting of 80 parts by weight of xylene, 10 parts by weight of the adduct of 8 to 10 moles of ethylene oxide to 1 mole of oleic acid N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 11

20 parts by weight of the compound from Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 12

20 parts by weight of the compound from Example 4 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 13

20 parts by weight of the compound from Example 1 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 14

3 parts by weight of the compound from Example 2 is intimately mixed with 97 parts by weight of particulate kaolin. A dust is obtained containing 3% by weight of the active ingredient.

EXAMPLE 15

30 parts by weight of the compound from Example 3 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. An O,O-dialkylthionophosphoric or O,O-dialkyldithiophosphoric ester of an oxadiazole having the formula

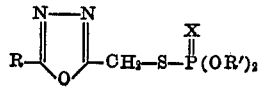

where R' denotes a lower alkyl radical, X denotes oxygen or sulfur, and R denotes an alkyl radical having 1 to 5 carbon atoms, or R denotes the radical

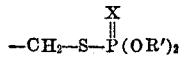

X and R' having the meanings given above.

2. A compound of the formula

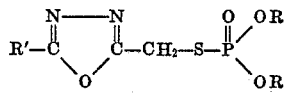

wherein each R is an alkyl radical of from one to four carbon atoms, and R' is an alkyl radical of from one to five carbon atoms.

3. A compound having the formula

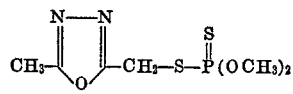

4. A compound having the formula

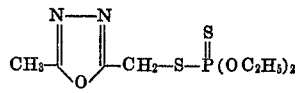

5. A compound having the formula

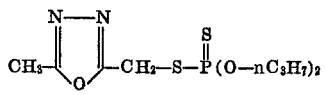

6. A compound having the formula

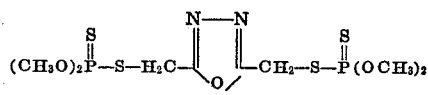

References Cited

UNITED STATES PATENTS 3,432,519  3/1969  Metivier et al. _____ 260—307

NICHOLAS S. RIZZO, Primary Examiner

R. V. RUSH, Assistant Examiner

U.S. Cl. X.R.

424—272